US010062909B2

(12) United States Patent
Liu et al.

(10) Patent No.: US 10,062,909 B2
(45) Date of Patent: Aug. 28, 2018

(54) COMPOSITION FOR FUEL CELL ELECTRODE

(71) Applicant: LG Fuel Cell Systems, Inc., North Canton, OH (US)

(72) Inventors: Zhien Liu, Canal Fulton, OH (US); Hwa Young Jung, Canton, OH (US); Zhengliang Xing, North Canton, OH (US); Richard W. Goettler, Medina, OH (US)

(73) Assignee: LG FUEL CELL SYSTEMS, INC., North Canton, OH (US)

( * ) Notice: Subject to any disclaimer, the term of this patent is extended or adjusted under 35 U.S.C. 154(b) by 0 days.

(21) Appl. No.: 15/337,890

(22) Filed: Oct. 28, 2016

(65) Prior Publication Data

US 2017/0149067 A1    May 25, 2017

Related U.S. Application Data

(60) Provisional application No. 62/247,535, filed on Oct. 28, 2015.

(51) Int. Cl.
  *H01M 4/90* (2006.01)
  *H01M 4/86* (2006.01)
  *H01M 8/124* (2016.01)

(52) U.S. Cl.
  CPC ....... *H01M 4/9033* (2013.01); *H01M 4/8673* (2013.01); *H01M 2004/8689* (2013.01); *H01M 2008/1293* (2013.01)

(58) Field of Classification Search
  None
  See application file for complete search history.

(56) References Cited

U.S. PATENT DOCUMENTS 4,663,250 A  5/1987 Ong et al.
4,888,254 A  12/1989 Reichner
(Continued)

FOREIGN PATENT DOCUMENTS

DE  4422624 A1  1/1996
DE  19627504 C1  10/1997
(Continued)

OTHER PUBLICATIONS

Fabrice Mauvy, Cécile Lalanne, Jean-Marc Bassat, Jean-Claude Grenier, Hui Zhao, Lihua Huo, and Philippe Stevens; "Electrode properties of Ln2NiO4+ (Ln = La, Nd, Pr) AC Impedance and DC Polarization Studies"; Available electronically Jun. 13, 2006; Journal of the Electrochemical Society, 153 (8) A1547-A1553 (2006).*
(Continued)

*Primary Examiner* — Barbara L Gilliam
*Assistant Examiner* — Nathanael T Zemui
(74) *Attorney, Agent, or Firm* — Dentons US LLP

(57) ABSTRACT

In some examples, a fuel cell comprising an anode; an electrolyte; cathode barrier layer; and a nickelate composite cathode separated from the electrolyte by the cathode barrier layer; and a cathode current collector layer. The nickelate composite cathode includes a nickelate compound and an ionic conductive material, and the nickelate compound comprises at least one of $Pr_2NiO_4$, $Nd_2NiO_4$, $(Pr_uNd_v)_2NiO_4$, $(Pr_uNd_v)_3Ni_2O_7$, $(Pr_uNd_v)_4Ni_3O_{10}$, or $(Pr_uNd_vM_w)_2NiO_4$, where M is an alkaline earth metal doped on an A—site of Pr and Nd. The ionic conductive material comprises a first co-doped ceria with a general formula of $(A_xB_y)Ce_{1-x-y}O_2$, where A and B of the first co-doped ceria are rare earth metals. The cathode barrier layer comprises a second co-doped ceria with a general formula $(A_xB_y)Ce_{1-x-y}O_2$, where at least one of A or B of the second co-doped ceria is Pr or Nd.

14 Claims, 11 Drawing Sheets

(56) References Cited

U.S. PATENT DOCUMENTS

| | | |
|---|---|---|
| 5,175,061 A | 12/1992 | Hildebrandt et al. |
| 5,273,837 A | 12/1993 | Aitken et al. |
| 5,549,983 A | 8/1996 | Yamanis |
| 5,928,805 A | 7/1999 | Singh et al. |
| 5,942,349 A | 8/1999 | Badwal et al. |
| 6,291,089 B1 | 9/2001 | Piascik et al. |
| 6,344,426 B1 | 2/2002 | Hata et al. |
| 6,558,832 B1 | 5/2003 | Bruck et al. |
| 6,623,881 B2 | 9/2003 | Badding et al. |
| 6,638,658 B1 | 10/2003 | McLean |
| 6,852,436 B2 | 2/2005 | Badding et al. |
| 6,949,307 B2 | 9/2005 | Cable et al. |
| 7,001,684 B2 | 2/2006 | Doshi et al. |
| 7,285,350 B2 | 10/2007 | Keefer et al. |
| 7,323,266 B2 | 1/2008 | Morishima et al. |
| 7,351,449 B2 | 4/2008 | Hunt et al. |
| 7,378,173 B2 | 5/2008 | Badding et al. |
| 7,378,174 B2 | 5/2008 | Hart et al. |
| 7,381,492 B2 | 6/2008 | Chen et al. |
| 7,510,819 B2 | 3/2009 | Chen et al. |
| 7,531,260 B2 | 5/2009 | Day et al. |
| 7,572,532 B2 | 8/2009 | Stevens et al. |
| 7,632,587 B2 | 12/2009 | McLean et al. |
| 7,709,124 B2 | 5/2010 | Barnett et al. |
| 7,718,113 B2 | 5/2010 | Crumm et al. |
| 7,732,002 B2 | 6/2010 | Kodas et al. |
| 7,781,109 B2 | 8/2010 | Gross |
| 7,842,434 B2 | 11/2010 | Rakowski et al. |
| 8,455,154 B2 | 6/2013 | Kwon et al. |
| 8,637,209 B2 | 1/2014 | Jacobson et al. |
| 8,828,618 B2 | 9/2014 | Day et al. |
| 9,263,749 B2 | 2/2016 | Takata |
| 2002/0102450 A1 | 8/2002 | Badding et al. |
| 2003/0096147 A1 | 5/2003 | Badding et al. |
| 2004/0023101 A1 | 2/2004 | Jacobson et al. |
| 2004/0028975 A1 | 2/2004 | Badding et al. |
| 2004/0106031 A1 | 6/2004 | Sherman et al. |
| 2004/0166394 A1 | 8/2004 | Sfeir et al. |
| 2004/0180252 A1 | 9/2004 | Wortman et al. |
| 2004/0265669 A1 | 12/2004 | Yoo |
| 2005/0014049 A1 | 1/2005 | Hart et al. |
| 2005/0031518 A1 | 2/2005 | Munakata et al. |
| 2005/0214613 A1 | 9/2005 | Sarkar et al. |
| 2005/0221138 A1 | 10/2005 | Chinchure et al. |
| 2005/0227134 A1 | 10/2005 | Nguyen |
| 2005/0249993 A1 | 11/2005 | Horiuchi et al. |
| 2005/0250004 A1 | 11/2005 | McLean et al. |
| 2006/0029860 A1 | 2/2006 | Ketcham et al. |
| 2006/0099442 A1 | 5/2006 | Tietz et al. |
| 2006/0153974 A1 | 7/2006 | Matsuzaki et al. |
| 2006/0166070 A1 | 7/2006 | Hickey et al. |
| 2006/0216575 A1 | 9/2006 | Cassidy |
| 2007/0037031 A1 | 2/2007 | Cassidy et al. |
| 2007/0072070 A1 | 3/2007 | Quek et al. |
| 2007/0087250 A1 | 4/2007 | Lewis et al. |
| 2007/0134537 A1 | 6/2007 | Reisdorf et al. |
| 2007/0184324 A1* | 8/2007 | Lyons ............... C04B 35/48 |
| | | 429/486 |
| 2007/0259242 A1 | 11/2007 | Schaevitz et al. |
| 2008/0124602 A1 | 5/2008 | Larsen et al. |
| 2008/0160376 A1 | 7/2008 | Badding et al. |
| 2008/0199738 A1 | 8/2008 | Perry et al. |
| 2009/0011307 A1 | 1/2009 | Lee et al. |
| 2009/0035635 A1 | 2/2009 | Bae et al. |
| 2009/0148743 A1 | 6/2009 | Day et al. |
| 2009/0162735 A1 | 6/2009 | Hasegawa |
| 2009/0169958 A1 | 7/2009 | Lin |
| 2010/0035101 A1 | 2/2010 | Maier et al. |
| 2010/0055533 A1 | 3/2010 | Kebbede et al. |
| 2010/0092829 A1 | 4/2010 | Fontaine et al. |
| 2010/0119886 A1 | 5/2010 | Nielsen et al. |
| 2010/0129693 A1 | 5/2010 | Nguyen et al. |
| 2010/0209802 A1 | 8/2010 | Armstrong et al. |
| 2010/0279194 A1 | 11/2010 | Elangovan et al. |
| 2011/0033779 A1 | 2/2011 | Badding et al. |
| 2012/0129068 A1 | 5/2012 | Narendar et al. |
| 2012/0186976 A1 | 7/2012 | Laucournet et al. |
| 2012/0244456 A1 | 9/2012 | Muecke et al. |
| 2012/0258241 A1 | 10/2012 | Tucker et al. |
| 2012/0321981 A1 | 12/2012 | Liu |
| 2012/0321982 A1 | 12/2012 | Liu et al. |
| 2012/0321984 A1 | 12/2012 | Goettler et al. |
| 2012/0321994 A1 | 12/2012 | Liu et al. |
| 2013/0122393 A1 | 5/2013 | Liu et al. |
| 2013/0230644 A1 | 9/2013 | Armstrong et al. |
| 2014/0017596 A1 | 1/2014 | Takata |
| 2014/0272622 A1 | 9/2014 | Xing et al. |
| 2016/0020470 A1 | 1/2016 | Jung et al. |

FOREIGN PATENT DOCUMENTS

| | | |
|---|---|---|
| DE | 19932194 A1 | 1/2001 |
| DE | 10050010 A1 | 4/2002 |
| DE | 10306649 A1 | 9/2004 |
| EP | 0532024 A1 | 3/1993 |
| EP | 0876687 B1 | 10/2002 |
| EP | 1304755 A2 | 4/2003 |
| EP | 1230706 B1 | 3/2004 |
| EP | 0815607 B1 | 5/2004 |
| EP | 1596457 A2 | 11/2005 |
| EP | 1624521 A1 | 2/2006 |
| EP | 1472754 B1 | 8/2006 |
| EP | 1768205 A1 | 3/2007 |
| EP | 1850412 A1 | 10/2007 |
| EP | 1852930 A1 | 11/2007 |
| EP | 2276094 A1 | 1/2011 |
| EP | 2462644 A1 | 6/2012 |
| JP | 11307114 A1 | 11/1999 |
| JP | 2005135729 A1 | 5/2005 |
| JP | 2010277877 A * | 12/2010 |
| JP | 2014186818 A | 10/2014 |
| WO | 9957780 A1 | 11/1999 |
| WO | 0229917 A1 | 4/2002 |
| WO | 2003007403 A1 | 1/2003 |
| WO | 03063285 A1 | 7/2003 |
| WO | 2004046627 A2 | 6/2004 |
| WO | 2005122300 A2 | 12/2005 |
| WO | 2006059943 A1 | 6/2006 |
| WO | 2006082057 A2 | 8/2006 |
| WO | 2006082057 A3 | 8/2006 |
| WO | 2008085488 A1 | 7/2008 |
| WO | 2008091801 A1 | 7/2008 |
| WO | 2008103253 A1 | 8/2008 |
| WO | 2009008979 A1 | 1/2009 |
| WO | 2009085143 A1 | 7/2009 |
| WO | 2012133263 A1 | 10/2012 |
| WO | 2012173990 A1 | 12/2012 |
| WO | 2012173997 A2 | 12/2012 |
| WO | 2012174000 A2 | 12/2012 |
| WO | 2012174002 A2 | 12/2012 |
| WO | 2012174004 A2 | 12/2012 |
| WO | 2014143957 A1 | 9/2014 |

OTHER PUBLICATIONS

JP2010277877A Original and Translation from Espacenet.*
Choisnet, "Structure and Bonding Anisotropy in Intergrowth Oxides: A Clue to the Manifestation of Bidimensionality in T-, T'-, and T*-Type Structures," Journal of Slid State Chemistry, vol. 147, No. 1, Oct. 1999, pp. 379-389.
Ferchaud et al., "High performance praseodymium nickelate oxide cathode for low temperature solid oxide fuel cell," Journal of Power Sources, vol. 196, ScienceDirect, Sep. 22, 2010, pp. 1872-1879.
Hendriksen et al., "Development and Durability of SOFC Stacks," RISØ National Laboratory Public Report, Jan. 12, 2004, 31 pp.
Huang et al., "Bi-layer structures as solid oxide fuel cell interconnections," Solid State Ionics, vol. 177, retrieved from www.sciencedirect.com, Apr. 20, 2005, 4 pp.
Hui et al., "Electrical Properties of Yttrium-Doped Strontium Titanate under Reducing Conditions," Journal of the Electrochemical Society, vol. 149, No. 1, Nov. 20, 2001, 10 pp.

(56) References Cited

OTHER PUBLICATIONS

Hui et al., "Evaluation of yttrium-doped SrTiO3 as an anode for solid oxide fuel cells," Journal of the European Ceramic Society, vol. 22, retrieved from www.elsevier.com, Oct. 28, 2001, 9 pp.

Kharton et al., "Ionic transport in oxygen-hyperstoichiometric phases with K2NiF4-type structure," Solid State Ionics, vol. 143, Elsevier, Jul. 2001, pp. 337-353.

Kharton et al., "Oxygen ion transport in La2NiO4-based ceramics," Journal of Materials Chemistry, vol. 9, Jul. 15, 1999, 7 pp.

Kovalevsky et al., "Oxygen permeability, stability, and electrochemical behavior of Pr2NiO4+d-based materials," Journal of Electroceramics, vol. 27, Springer Science + Business Media, Feb. 24, 2007, 14 pp.

Kovalevsky et al., "Stability and oxygen transport properties of Pr2NiO4+d ceramics," Journal of the European Ceramic Society, vol. 27, ScienceDirect, Mar. 28, 2007, pp. 4269-4272.

Yi, et al., Fabrication of MNCo2O4/gadolinia-doped Ceria (GDC) Dual-phase Composite Membrane for Oxygen Separation, Journal of the Korean Ceramic Society, vol. 47, No. 2, pp. 199-204, Mar. 2010.

Marina et al., "Thermal, electrical, and electrocatalytical properties of lanthanum-doped strontium titanate," Solid State Ionics, vol. 149, retrieved from www.elsevier.com, Feb. 28, 2002, 8 pp.

Mauvy et al., "Oxygen electrode reaction on Nd2NiO4+d cathode materials: impedance spectroscopy study," Solid State Ionics, vol. 158, ScienceDirect, Elsevier, Jul. 25, 2002, pp. 17-28.

Nomura et al., "Electrode properties of doped Pr2NiO4-based oxide cathode for intermediate-temperature SOFCs," Journal of the Ceramic Society of Japan, vol. 120, The Ceramic Society of Japan, Oct. 4, 2012, pp. 534-538.

Weber et al., "The Influence of A-Site-Deficiency on the Performance of Strontium Doped Lanthanum-Manganate Perovskite Type SOFC-Cathodes," Proceedings on the 17th Risoe International Symposium on Materials Science: High Temperature Electrochemistry: Ceramics and Metals, Jan. 1, 1996, 6 pp.

Schuler et al., "Mitigating Cr Contamination by Hot Air Filtering in Solid Oxide Fuel Cells," Electrochemical and Solid-state Letters, vol. 14(12), Nov. 2011, 4 pp.

Skinner et al., "Oxygen ion Conductors," Materials Today, Elsevier Science Ltd, Mar. 2003, 8 pp.

Taniguchi et al., "Suppression of Chromium Diffusion to an SOFC Cathode from an Alloy Separator by a Cathode Second Layer," Denki Kagaku, SANYO Electric Co., Ltd., Feb. 13, 1996, 7 pp.

Fu et al., "LA (sub 0.4) SR (sub 0.6) Ti(sub 1-x) MN (sb x) O (xub 3-[delta]) Perovskites as Anode Materials for Solide Oxide Fuel Cells," Abstract, Journal of the Electrochemical Society, vol. 1523, No. 4, Feb. 2006, 10 pg.

Lai et al., "Design Considerations for Segmented-in-Series Fuel Cell," Journal of Power Sources, vol. 147, No. 1-2, Sep. 9, 2005, 10 pp.

Pillai et al., "Short-period Segmented-in-Series Solid Oxide Fuel Cells on Flattened Tube Supports" Journal of Power Sources, vol. 163, No. 2, Jan. 1, 2007, 6 pp.

International Search Report and Written Opinion from International Application No. PCT/US2016/059436, dated Jan. 2, 2017, 5 pp.

Ramasamy, et al., "Enhancing electrochemical performance by control of transport properties in buffer layers—solid oxide fuel/electrolyser cells," Phys. Chem. Chem. Phys., vol. 17, No. 17, Apr. 2, 2015, pp. 11527-11539.

Zhu, et al., "Preparation and properties for solid solution Ce0.8Pr0.2-xNdxO2-δ (x=0.02, 0.05, 0.1)," Advanced Materials Research, vol. 1065-1069, Dec. 11, 2014, pp. 1921-1925.

Mauvy et al., "Electrode properties of Ln2NiO4+δ, (Ln =La, Nd, Pr)," Journal of the Electrochemical Society, vol. 153, Jun. 13, 2006, pp. A1547-A1553.

Miyoshi et al., "Mixed Conductivity and Oxygen Permeability of Doped Pr2NiO4-Based Oxides," Journal of the Electrochemical Society, vol. 154, Nov. 17, 2006, pp. B57-B62.

Sadykov et al., "In situ X-ray diffraction studies of Pr2—xNiO4 + δ crystal structure relaxation caused by oxygen loss," Solid State Ionics, vol. 262, ScienceDirect, Elsevier, Feb. 18, 2014, pp. 918-922.

Yashima et al., "Crystal Structure, Diffusion Path, and Oxygen Permeability of a Pr2NiO4-Based Mixed Conductor (Pr0.9La0.1 )2(Ni0.74Cu0.21 Ga0.05)O4+δ," Journal of the American Chemical Society, vol. 132, No. 7, Feb. 1, 2010, pp. 2385-2392.

Solis et al., "Study of Pr and Pr and Co Doped La2NiO4+δ as Cathodes for La5.5WO11.25-δ Based Protonic Conducting Fuel Cells," Journal of Power Sources, Elsevier, vol. 240, May 21, 2013, pp. 691-697.

Wei et al., "Enhancement of Oxygen Permeation Through U-Shaped K2NiF4-Type Oxide Hollow Fiber Membranes by Surface Modifications," Separation and Purification Technology, Elsevier, vol. 110, Mar. 14, 2013, pp. 74-80.

Lou et al., "Preparation and Electrochemical Characterization of Ruddlesden-Popper Oxide La4Ni3O10 Cathode for IT-SOFCs by Sol-gel Method," Journal of Solid State Electrochemistry, vol. 17, No. 10, Jul. 11, 2013, pp. 2703-2709.

* cited by examiner

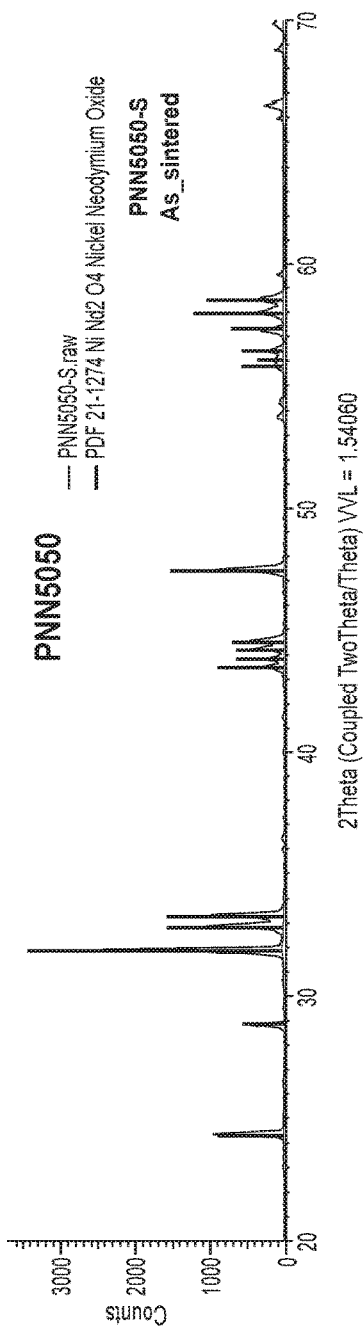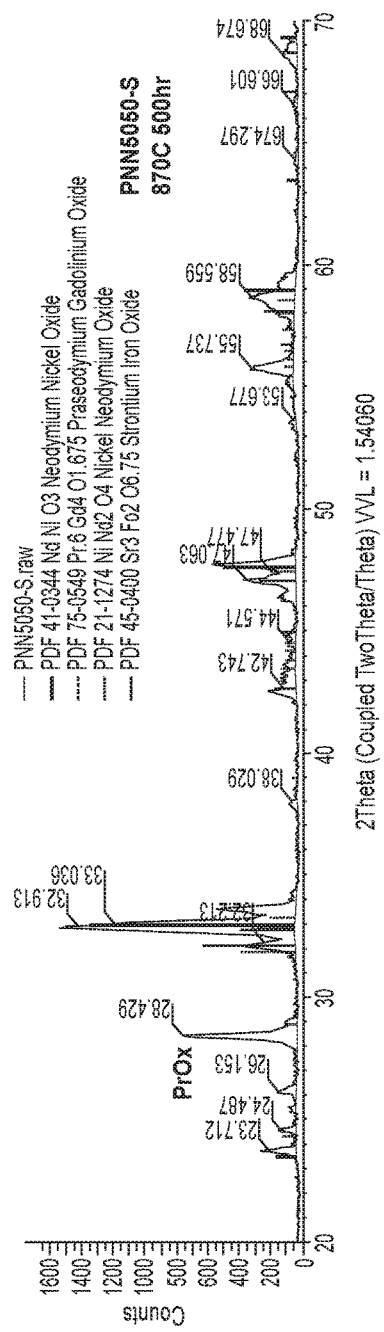
FIG. 3A
FIG. 3B

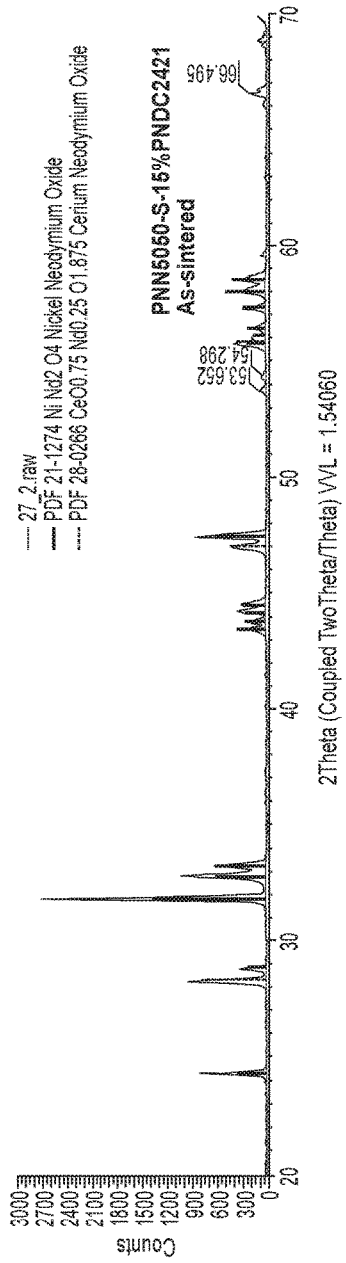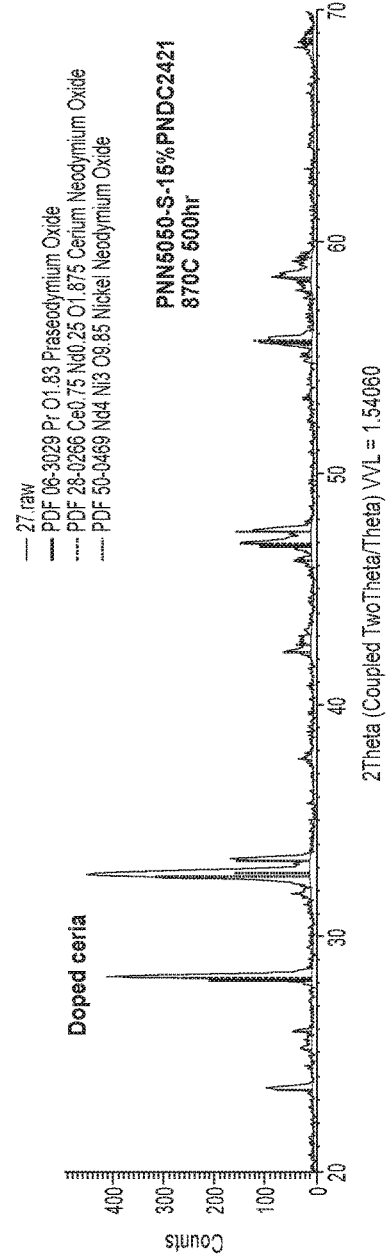

US 10,062,909 B2

COMPOSITION FOR FUEL CELL ELECTRODE

This application claims the benefit of U.S. Provisional Application No. 62/247,535, filed Oct. 28, 2015, the entire content of which is incorporated herein by reference.

This invention was made with Government support under Assistance Agreement No. DE-FE0000303 awarded by Department of Energy. The Government has certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

Example compositions for cathodes of fuels cells, such as, e.g., solid oxide fuels cells, are described. For example, electrochemical fuel cells including cathodes formed of a nickelate composite material are described. The nickelate composite material of the cathode may include a nickelate compound and an ionic conductive material. The ionic conductive material may be co-doped ceria. The composition of the nickelate composite cathode may allow for improved long term durability and high performance of the cathode and fuel cell under fuel cell operating conditions, for example, as compared to only a nickelate compound. For example, the nickelate compounds of the nickelate composite cathode material may exhibit relatively low area specific resistance (ASR) and better performance, e.g., as compared to other nickelate compounds. The co-doped ceria of the nickelate composite cathode material may be selected to manage material interdiffusion within the cathode and increase the phase stability of the nickelate to increase long term durability of the cathode and fuel cell, e.g., by allowing for exsoluted elements from the A-site and/or B-site of the nickelate compound to diffuse into the ionic phase rather than forming an oxide from the exsolute. In some examples, Ni on the B-site may not diffuse into the ionic phase (e.g., the Ni on the B-site may be exsoluted and not diffused into the ionic phase). The fuel cell may also include a cathode barrier layer separating the cathode from an electrolyte in the fuel cell. The cathode barrier layer may be formed of a co-doped ceria and may be configured to manage material diffusion (e.g., out of the cathode) and increase cathode phase stability.

In one example, the disclosure relates to a fuel cell comprising an anode; an electrolyte; cathode barrier layer; and a nickelate composite cathode separated from the electrolyte by the cathode barrier layer; and a cathode current collector layer. The nickelate composite cathode includes a nickelate compound and an ionic conductive material, and the nickelate compound comprises at least one of $Pr_2NiO_4$, $Nd_2NiO_4$, $(Pr_uNd_v)_2NiO_4$, $(Pr_uNd_v)_3Ni_2O_7$, $(Pr_uNd_v)_4Ni_3O_{10}$, or $(Pr_uNd_vM_w)_2NiO_4$, where M is an alkaline earth metal doped on an A—site of Pr and Nd. The ionic conductive material comprises a first co-doped ceria with a general formula of $(A_xB_y)Ce_{1-x-y}O_2$, where A and B of the first co-doped ceria are rare earth metals. The cathode barrier layer comprises a second co-doped ceria with a general formula $(A_xB_y)Ce_{1-x-y}O_2$, where at least one of A or B of the second co-doped ceria is Pr or Nd. The anode, cathode barrier layer, nickelate composite cathode, cathode current collector layer, and electrolyte are configured to form an electrochemical cell.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

FIGS. 3A and 3B are plots illustrating XRD results for an example nickelate cathode composition before and after aging, respectively.

FIGS. 5A and 5B are plots illustrating XRD results for another example nickelate composite cathode composition before and after aging, respectively.

Figure 1:
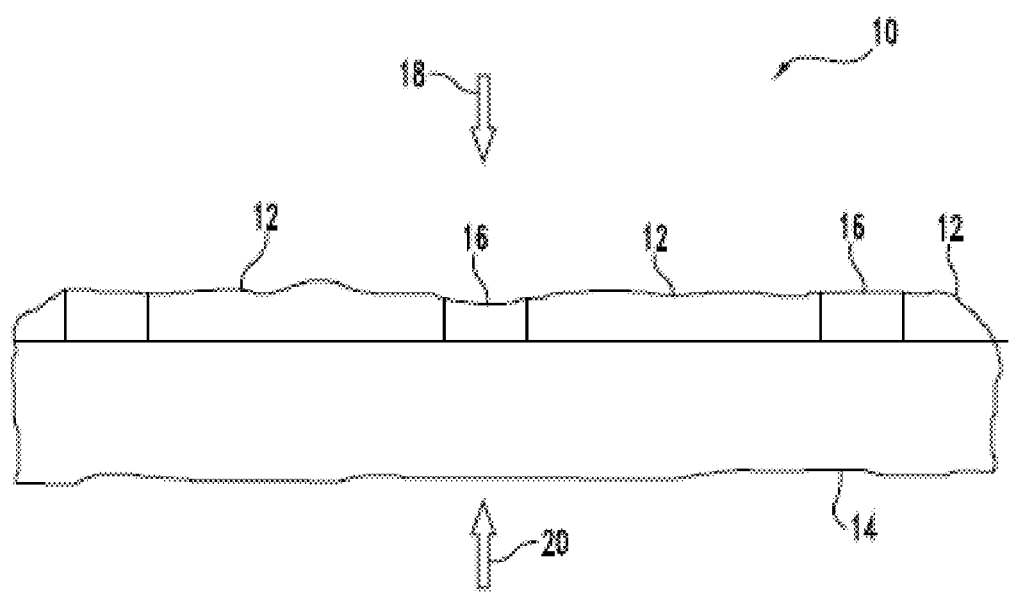
FIG. 1 is a schematic diagram illustrating an example fuel cell system in accordance with an embodiment of the present disclosure.

Referring to the drawings, some aspects of a non-limiting example of a fuel cell system in accordance with an embodiment of the present disclosure is schematically depicted. In the drawing, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

As described above, examples of the present disclosure relate to example compositions for cathodes of fuels cells, such as, e.g., solid oxide fuels cells. A solid oxide fuel cell may be an electrochemical system configured to convert fuel (e.g., hydrogen) to electricity at relatively high temperatures (e.g., greater than about 500 degrees Celsius). In some examples, lower power degradation rate and lower cost can be achieved when operating these systems at lower temperatures. However, polarization of the cathode of the fuel cell may be relatively high at lower temperatures, which can affect system performance.

In some examples, cathodes may be formed of lanthanide nickelate having the general formula $Ln_2NiO_{4+\delta}$. Lanthanide nickelates may have a layered structure with alternating layers of perovskites and sodium chloride type layers. The interstitial oxide-ions are accommodated by the mismatch of the equilibrium (Ln—O) and (M—O) bond lengths where the structural tolerance factor t is less than 1. This highly mobile $O^{2-}$ exhibits a good ionic conductivity. Moreover, in this structure, the Ni (III)/Ni (II) redox couples are pinned at the top of the $O^{2-}$: $2p^6$ bands to give an acceptably high electronic conductivity in the mixed-valence state. Due to its unique structure, lanthanide nickelate cathodes may have lower activation energy than other cathode materials being used for solid oxide fuel cells, such as LSM and LSCF. Further, lanthanide nickelate cathode polarization resistance may be less dependent on temperature change than other materials. Therefore, this material may maintain lower ASR at lower operating temperatures. Especially low ASR has been demonstrated from praseodymium nickelate cathode. However, one issue is that nickelate materials can be unstable under fuel cell operating temperatures, such as between about 700 to about 900 degrees Celsius. For example, under fuel cell operating conditions, the favorable phase of the nickelate cathode tends to decompose into undesired phases, which causes fuel cell performance degradation.

Due to its lower ASR, especially at lower temperatures, nickelate cathodes continue to be of interest in the field of fuel cells. In some examples, A-site doping, such as Sr or Ca, and B-site doping, such as Cu, Co, Fe, etc., may be employed in an attempt to stabilize nickelate phase. However, such attempts have achieved limited success and/or other issues were present, such as higher coefficient of thermal expansion (CTE) of the cathodes, resulting in a mismatch with other fuel cell materials or substrate.

Analysis has indicated that nickelate decomposition initiated from element exsolution from the A-site of a doped nickelate, such as Pr exolution from $Pr_2NiO_4$, may result in the formation of oxide. When too much A site element exolutes form nickelate, Ni may become rich on the B-site, and eventually exolutes from B-site to form NiO. Analysis also indicates that exoluted A-site element tends to diffuse into a cathode interlayer made from doped ceria on top of a stabilized zirconia electrolyte.

In accordance with some aspects of the disclosure, technique may be used to manage phase composition of a nickelate cathode to maintain favorable phases during fuel cell operation, to achieve relatively fine microstructure for higher triple phase boundary and stronger cathode/interlayer bonding through addition of ionic phase into the nickelate cathode. For example, as will be described below, the composition of ionic phase may be varied based on nickelate cathode composition to manage element diffusion (e.g., minimize material diffusion) to maintain favorable phases during fuel cell operation. Furthermore, the particular nickelate compositions of the cathode may exhibit lower ASR and/or better performance compared to other nickelates, such as, e.g., lanthanide nickelate having the general formula $Ln_2NiO_{4+\delta}$. Additionally, examples of the disclosure may also include a cathode barrier layer separating the nickelate composite cathode from an electrolyte in the fuel cell. The cathode barrier layer may be formed of a co-doped ceria and may be configured to manage material diffusion (e.g., out of the cathode) and increase cathode phase stability.

Examples of the disclosure may provide for one or more advantages. In some examples, the nickelate composite cathode materials described herein may be used for to improve fuel cell system performance and reduce cost by operating the system at lower temperatures compared to that of fuel cells employing different cathode materials. For example, by employing such nickelate composite cathode materials, a fuel cell may be operated at a temperature between about 700 to about 900 degrees Celsius to generate electricity from a fuel source, such as, e.g., hydrogen, natural gas, or syngas fuel, with high performance and long term durability and cost reduction. In some examples, the phase composition of nickelate composite cathodes during fuel cell operation may be managed to maintain favorable phase to improve long term durability through addition of ionic phase with different composition. In some examples, the phase composition of nickelate composite cathodes during fuel cell operation may be managed to maintain favorable phase to improve long term durability through the use of a cathode barrier layer with a composition selected based on the composition of the nickelate cathode. Examples of the disclosure may provide for improved nickelate cathode microstructure to increase triple phase boundary for both lower ASR and long term stability through the addition of ionic phase to the nickelate of the cathode. In some examples, the disclosure relates to approaches for improving the bond or attachment of a nickelate cathode with a cathode barrier layer, which may allow for reduced interface polarization and/or improved long term cathode reliability. Multiple electrochemical tests have been performed on example nickelate composite cathodes of this disclosure and the test demonstrated improved long term durability and a reduction in degradation rate. Examples of the disclosure may provide for other additional advantages, such as, e.g., those apparent from the description herein.

FIG. 1 is a schematic diagram illustrating an example fuel cell system 10 in accordance with an embodiment of the present disclosure. As shown in FIG. 1, fuel cell system 10 includes a plurality of electrochemical cells 12 (or "individual fuel cells") formed on substrate 14. Electrochemical cells 12 are coupled together in series by interconnect 16. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and is supplied to electrochemical cells 12 from oxidant side 18. Substrate 14 may be specifically engineered porosity, e.g., the porous ceramic material is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown)

in porous substrate 14. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen. In addition, although fuel is supplied to electrochemical cells 12 via substrate 14, it will be understood that in other embodiments, the oxidant may be supplied to the electrochemical cells via a porous substrate.

Figure 2:
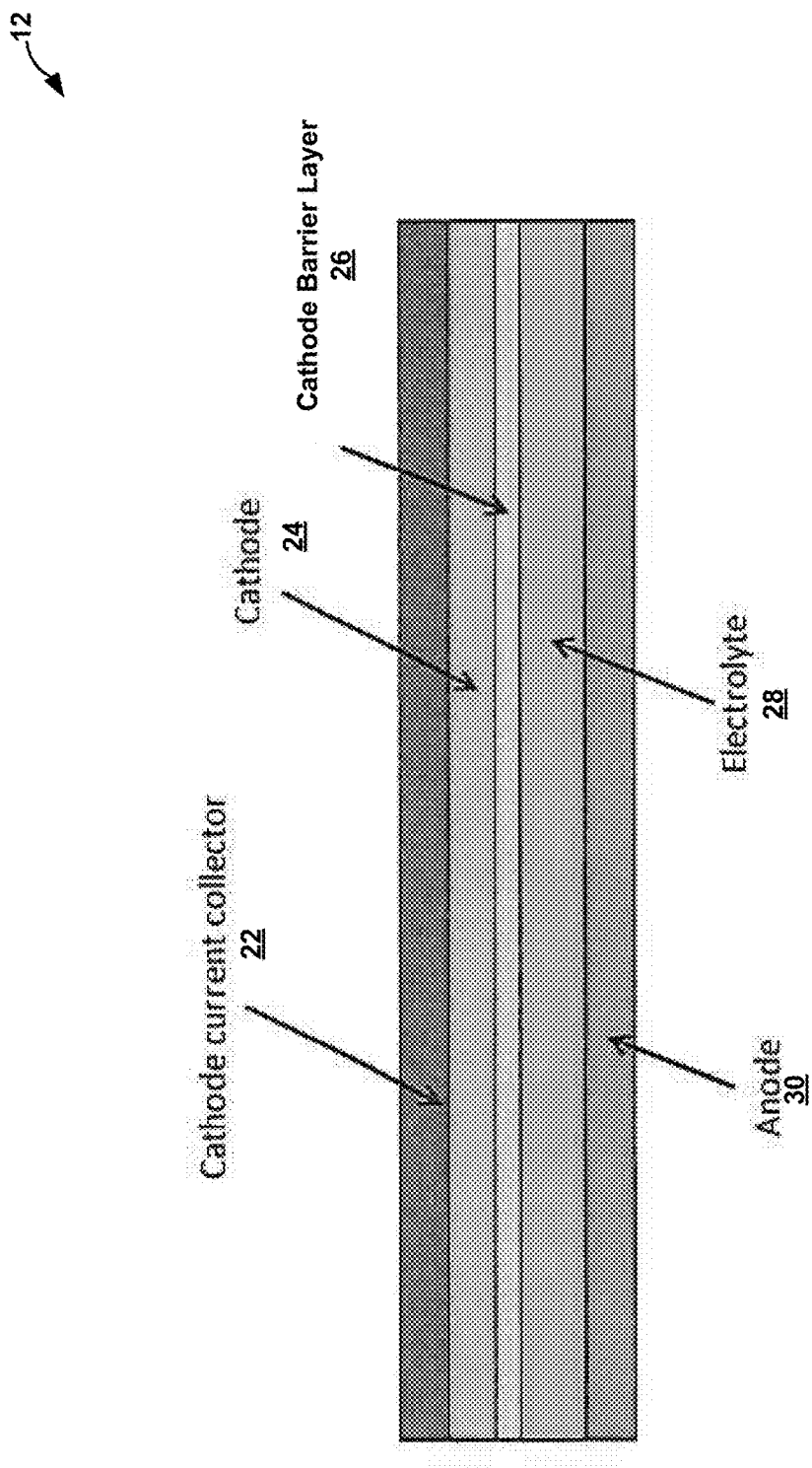
FIG. 2 is a schematic diagram illustrating an example cross section of a fuel cell system in accordance with an embodiment of the present disclosure.

FIG. 2 is a conceptual diagram illustrating an example configuration of an electrochemical fuel cell 12 in accordance with an embodiment of the present disclosure. Electrochemical fuel cell 12 may be formed of a plurality of layers screen printed onto substrate (or porous anode barrier layer) 14. This may include a process whereby a woven mesh has openings through which the fuel cell layers are deposited onto substrate 14. The openings of the screen determine the length and width of the printed layers. Screen mesh, wire diameter, ink solids loading and ink rheology may determine the thickness of the printed layers.

Electrochemical cell 12 includes cathode current collector 22, cathode 24, cathode barrier layer 26, electrolyte 28, and anode 30. In one form, each of the respective components may be a single layer or may be formed of any number of sub-layers. It will be understood that FIG. 2 is not necessarily to scale. For example, vertical dimensions are exaggerated for purposes of clarity of illustration. Additionally, one or more other layers may be present in other examples, such as, e.g., an anode current collector on the side of anode 30 opposite electrolyte 28.

In electrochemical cell 12, anode 30 conducts free electrons to cathode current collector 22 via interconnect 16 (shown in FIG. 1). Cathode current collector 22 conducts the electrons to cathode 24. Interconnect 16 (shown in FIG. 1) is electrically coupled to anode 30 and to cathode current collector 22 of adjacent electrochemical cells.

Interconnects 16 (FIG. 1) for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

Interconnect 16 may be formed of a precious metal including Ag, Pd, Au and/or Pt and/or alloys thereof, although other materials may be employed without departing from the scope of the present disclosure. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, and an inert ceramic phase, such as alumina, or ceramic phase with minimum ionic conductivity which will not create significant parasitics, such as YSZ (yttria stabilized zirconia, also known as yttria doped zirconia, yttria doping is 3-8 mol %, preferably 3-5 mol %), ScSZ (scandia stabilized zirconia, scandia doping is 4-10 mol %, preferably 4-6 mol %), doped ceria, and/or conductive ceramics, such as conductive perovskites with A or B-site substitutions or doping to achieve adequate phase stability and/or sufficient conductivity as an interconnect, e.g., including at least one of doped strontium titanate (such as $La_xSr_{1-x}TiO_{3-\delta}$, x=0.1 to 0.3), LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, where x=0.15-0.3), and conductive ceramics, such as doped strontium titanate, doped yttrium chromites, LSCM ($La_{1-x}Sr_xCr_{1-y}Mn_yO_3$), and other doped lanthanum chromites. In one example, interconnect 16 may be formed of $y(Pd_xPt_{1-x})$-(1-y)YSZ. Where x is from 0 to 1 in weight ratio, preferably x is in the range of 0 to 0.5 for lower hydrogen flux. Y is from 0.35 to 0.80 in volume ratio, preferably y is in the range of 0.4 to 0.6.

Anode 30 may be an electrode conductive layer formed of a nickel cermet, such as Ni—YSZ (e.g., where yttria doping in zirconia is 3-8 mol %,), Ni—ScSZ (e.g., where scandia doping is 4-10 mol %, preferably including a second doping for example 1 mol % ceria for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R-P phases of the general formula a $(La_{1-x}Sr_x)_{n+1}Mn_nO_{3n+1}$ Alternatively, it is considered that other materials for anode 30 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired CTE in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, and $NiCr_2O_4$. In other embodiments, the ceramic phase may be electrically conductive, e.g., doped lanthanum chromite, doped strontium titanate and/or one or more forms of LaSrMnCr0 and/or R-P phases of the general formula $(La_{1-x}Sr_x)_{n+1}Mn_nO_{3n+1}$ Electrolyte 28 may be made from a ceramic material. In one form, a proton and/or oxygen ion conducting ceramic, may be employed. In one form, electrolyte 28 is formed of YSZ, such as 3YSZ and/or 8YSZ. In other embodiments, electrolyte layer 28 may be formed of ScSZ, such as 4ScSZ, 6ScSz and/or 10SclCeSZ in addition to or in place of YSZ. In other embodiments, other materials may be employed. For example, it is alternatively considered that electrolyte 28 may be made of doped ceria and/or doped lanthanum gallate. In any event, electrolyte 28 is substantially impervious to diffusion there through of the fluids used by fuel cell 10, e.g., synthesis gas or pure hydrogen as fuel, as well as, e.g., air or $O_2$ as an oxidant, but allows diffusion of oxygen ions or protons.

Cathode current collector 22 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), $La_{1-x}Sr_xCoO_3$ and/or $Pr_{1-x}Sr_xCoO_3$, such as $Pr_{0.8}Sr_{0.2}CoO_3$. In other embodiments, Cathode current collector 22 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion. As will be described below, in some examples, cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In some examples, anode 30 may have a thickness of approximately 5-20 microns, although other values may be employed without departing from the scope of the present invention. For example, it is considered that in other embodiments, the anode layer may have a thickness in the range of approximately 5-40 microns. In yet other embodiments, different thicknesses may be used, e.g., depending upon the particular anode material and application.

Electrolyte 28 may have a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of approximately 5-200 microns. In yet other embodiments, different thicknesses may be used, e.g., depending upon the particular materials and application.

Cathode 24 may have a thickness of approximately 3-30 microns, such as, e.g., approximately 5-10 microns, although other values may be employed without departing from the scope of the present invention. For example, it is considered that in other embodiments, the cathode layer may have a thickness in the range of approximately 10-50 microns. In yet other embodiments, different thicknesses may be used, e.g., depending upon the particular cathode material and application.

Cathode current collector 22 may have a thickness of approximately 5-100 microns, although other values may be employed without departing from the scope of the present invention. For example, it is considered that in other embodiments, cathode current collector 22 may have a thickness less than or greater than the range of approximately 5-100 microns. In yet other embodiments, different thicknesses may be used, e.g., depending upon the particular material and application.

In some examples, cathodes may be electronic conductors only. To improve the cathode performance, separate ionic phase may be added to help oxygen ion transport to triple phase boundary away from the electrolyte interface. Some cathodes, such as nickelates, may be mixed ionic-electronic conductor. Theoretically second ionic phase may not be necessary for these cathode materials. However, there are benefits for these materials, such as nickelate, to form a composite cathode with second ionic phase. The benefits may include, but are not limited to, microstructure control to increase triple phase boundary, improvement of interface adhesion to increase triple phase boundary and reduce interface ohmic resistance, or management of materials diffusion, such as for nickelate.

In accordance with examples of the disclosure, cathode 24 may be formed of a nickelate composite material including a nickelate compound and an ionic conductive material. The nickelate compound may comprise at least one of $Pr_2NiO_4$, $Nd_2NiO_4$, $(Pr_uNd_v)_2NiO_4$, $(Pr_uNd_v)_3Ni_2O_7$, $(Pr_uNd_v)_4Ni_3O_{10}$, or $(Pr_uNd_vM_w)_2NiO_4$, where M is an alkaline earth metal doped on an A—site of Pr and Nd, $0.05 \leq M \leq 0.3$, $0.9 \leq u+v \leq 1.1$, preferably $0.95 \leq u+v \leq 1.0$, $0.9 \leq u+v+w \leq 1.1$, preferably $0.95 \leq u+v+w \leq 1.0$. The composite cathode formed from such nickelate compounds may exhibit relatively low ASR and relatively high performance in terms of ASR or internal resistance of a fuel cell, e.g., compared to other nickelate compounds, such as, e.g., lanthanide nickelate having the general formula $Ln_2NiO_{4+\delta}$. The lower ASR, the higher performance. Higher ASR will result in higher heat loss and less power output. In some examples, the nickelate composite cathode 24 may have an ASR of approximately 0.02 ohm-$cm^2$ at 1 bara and about 790 degrees Celsius or less and lower degradation rate.

The ionic conductive material of cathode 24 may be provided to improve one more properties of cathode 24, such as, e.g., increased triple phase boundary, improved adhesion with cathode barrier layer, desired phase constitution, and reduced degradation of cathode layer 24 in a high temperature operating environment compared to that of a cathode with only the nickelate composition. The ionic conductive material may comprise a first co-doped ceria with a general formula of $(A_xB_y)Ce_{1-x-y}O_2$, where A and B of the first co-doped ceria are rare earth metals. In some examples, the one of A and B of the first co-doped ceria is Pr or Nd. In some examples, A of the first co-doped ceria is Pr and B of the cathode barrier layer is Nd. Theoretically any rare earth metal can be selected for A or B. However, since there is Pr or Nd on A site of nickelate, Pr, or Nd, or Pr and Nd may be preferred for A, or B or A and B for less material interdiffusion between nickelate and doped ceria.

In some examples, examples of the disclosure may control and manage phase constitution in a nickelate composite cathode to maintain desired phases for lower cathode or fuel cell degradation rate through minimizing material diffusion. For example, the presence and composition of the ionic conductive material may manage material interdiffusion and maintain desired phase constitution in nickelate composite cathode 24. Nickelate has a general formulation, $A_{n+1}B_nO_{3n+1}$ (n=1, 2, and 3), and different phase with composition change. When n=1, the nickelate phase mentioned herein may not be stable under fuel cell operating conditions, and a rare earth metal in A site, such as Pr, tends to exolutes from nickelate structure to form oxide. $PrO_x$ oxide, which has higher CTE (e.g., about 19 ppm/K from room temperature to about 900 degrees Celsius), compared to nickelate compounds (e.g., about 14 ppm/K). Continued exolution of rare earth metal from the A site may result in Ni rich in B site, and then Ni may exolute from B site to form NiO which is known inactive catalyst. Both rare earth metal oxide (such as $PrO_x$) and NiO may be referred to as the third phase in the composite cathode. The formation of third phases in nickelate composite cathode may change cathode microstructure and thermal expansion to cause degradation due to reduction of triple phase boundary and local cathode detachment from electrolyte or cathode barrier layer due to thermal stress.

Therefore, rare earth metal oxide, such as $PrO_x$, and NiO may not be desired phases. Doped ceria may be a stable phase. When forming composite cathode with a nickelate compound, it can adsorb rare earth metal oxide, such as $PrO_x$, exoluted from the nickelate to form solid solution to avoid undesired phase formation. Especially if doped ceria already contains Pr, or Nd, or both Pr and Nd in its starting composition, it can slow down or hinder rare earth metal exolution from nickelate. In this manner, in some examples, the ionic phase can manage phase constitution in nickelate composite cathode, which can be achieved through controlling the composition of doped ceria and the amount of doped ceria added to nickelate.

Cathode 24 may include any suitable concentrations of nickelate compound and ionic conductive compound. In some examples, cathode 24 may include approximately 10 weight percent (wt %) to approximately 95 wt % of the nickelate compound, such as, e.g., approximately 50 wt % to approximately 70 wt % of the nickelate compound. In some examples, cathode 24 may include approximately 5 wt % to approximately 90 wt % of the ionic conductive compound, such as, e.g., approximately 20 wt % to approximately 50 wt % of the ionic conductive compound. In some examples, the preferred ionic phase ratio to nickelate may be about 10 wt % to about 50 wt % depending on chemical composition of both deped ceria and nickelate compound. If the ionic phase is too low, it cannot adsorb all the rare earth metal oxide exoluted from nickelate, which will form undesired third phase. If the ionic phase is too high, the exolution of rare earth metal from nickelate may continue since ionic phase can adsorb more rare earth metal till B site rich nickelate compound is formed, which may result in NiO exolution from B site of nicelate to form undesired third phase NiO. In some examples, cathode 24 may consist of, consist essentially of, or comprise the nickelate compound and ionic conductive compound.

The composition of cathode 24 may change from the composition as-fabricated following operation of fuel cell 12 at a high temperature (e.g., greater than, e.g., about 700 degrees Celsius. For example, rare earth metal exolution from nickelate may change cathode microstructure to reduce triple phase boundary and increase cathode CTE to cause cathode detachment from electrolyte or cathode barrier layer in local area. It may further cause B site rich nickelate cathode formation which may result in NiO exolution from B site of nickelate cathode. All these microstructural and phase changes may increase cathode ASR. In some examples, cathode 24 is substantially free of oxide formed exoluted A-site element and/or B-site element from the nickelate compound following operation at a temperature of approximately 790 degrees Celsious or greater after approximately 100 hours with degradation rate of about 0.03 ohm-cm$^2$/1000 hr using symmetric button cell. In some examples, cathode 24 includes diffused exolute from the nickelate in a phase of the ionic conductive material following operation at a temperature of approximately 790 degrees Celsius or greater after about 100 to about 2200 hours with degradation rate of about 0.002 to about 0.013 ohm-cm$^2$/1000 hr using segmented-in-series cell design. In some examples, fuel cell with cathode 24 exhibits an area specific resistance (ASR) of approximately 0.22 ohm-cm$^2$ or less following operation at a temperature of approximately 860 degrees Celsius after approximately 6600 hours.

Additionally, as shown in FIG. 2, electrochemical fuel cell 12 may include a cathode barrier layer 26 between electrolyte 28 and cathode 24. Cathode barrier layer 26 may be formed of a second co-doped ceria with a general formula $(A_xB_y)Ce_{1-x-y}O_2$, where at least one of A or B of the second co-doped ceria is Pr or Nd. In some examples, A of the second co-doped ceria is Pr and B of the cathode barrier layer is Nd.

In some examples, the function of cathode barrier layer 26 may be at least twofold. First, the barrier layer can prevent chemical interaction between electrolyte 28 (e.g., Y or Sc stabilized zirconia) and nickelate. Without cathode barrier layer 26, the rare earth metal, such as Pr, in nickelate may interact with electrolyte 28 to form $Pr_2Zr_2O_7$ undesired phase to increase cell ASR under some conditions during fuel cell operation. Second, cathode barrier layer 26 can help to control rare earth metal exolution from nickelate compound based on concentration difference (material tends to migrate from higher concentration to lower concentration) to manage phase constitution in cathode 24 to keep desired phases for lower degradation rate. For example, $(Pr_xNd_y)Ce_{1-x-y}O_2$ cathode barrier may be selected as cathode barrier layer 26 for $(Pr_uNd_v)_2NiO_4$, $(Pr_uNd_v)_3Ni_2O_7$, and $(Pr_uNd_v)_4Ni_3O_{10}$ cathode and composite cathode composed of such nickelate compounds.

In one example of fuel cell 12, cathode 24 is formed of a composite nickelate having the general formula $Pr_2NiO_4$, $-A_xB_yCe_{(1-x-y)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably one of A and B is Pr. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably A or B is Pr. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $Nd_2NiO_4$, $-A_xCe_{(1-x)}O_2$, where A is rare earth metal (such as, e.g., La, Pr, Nd, Gd, Sm, Tb, Dy, Yb, Y, Ho, Er, and the like), and 0<x<1 (preferably 0.1≤x≤0.4). Cathode barrier layer 26 is formed of a composition having the general formula $A_xCe_{(1-x)}O_2$, where A is rare earth metal (such as, e.g., La, Pr, Nd, Gd, Sm, Tb, Dy, Yb, Y, Ho, Er, and the like), and 0<x<1 (preferably 0.1≤x≤0.4). Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $Nd_2NiO_4$, $-A_xB_yCe_{(1-x-y)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably one of A and B is Nd. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y≤0.5 (preferably 0.05≤y≤0.3). In some example, preferably A or B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_2NiO_4$, $-A_xB_yCe_{(1-x-y)}O_2$, where A is rare earth metal (such as, e.g., La, Pr, Nd, Gd, Sm, Tb, Dy, Yb, Y, Ho, Er, and the like), 0≤x<0.5 (preferably 0.05≤x≤0.3), B is different rare earth metal element from A (such as, e.g., Gd, La, Pr, Nd, Sm, Tb, Dy, Yb, Y, Ho, Er, and the like), 0≤y<0.5 (preferably 0.05≤y≤0.3), 0<u<1, and 0<v<1 (preferably 0.25<u<0.75 and 0.25<v<0.75). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_3Ni_2O_7$, $-A_xB_yCe_{(1-x-y)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), 0≤y<0.5 (preferably 0.05≤y≤0.3), 0<u<1, and 0<v<1 (preferably 0.25<u<0.75 and 0.25<v<0.75). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_4Ni_3O_{10}$, $-A_xB_yCe_{(1-x-y)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal from A (such as, e.g., Gd, La, Pr, Nd, Sm, Tb, Dy, Yb, Y, Ho, Er, and the like), 0≤y<0.5 (preferably 0.05≤y≤0.3), 0<u<1, and 0<v<1 (preferably 0.25<u<0.75 and 0.25<v<0.75). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_vM_w)_2NiO_4$, $-A_xB_yCe_{(1-x-y)}O_2$, where M is alkaline earth metal (such as, e.g., Sr, Ca, Ba, and the like), 0<u<1 and 0<v<1 (preferably 0.3<u<0.7 and 0.3<v<0.7 or 0.25<u<0.75 and 0.25<v<0.75), 0<w<0.3 (preferably, 0.05<w<0.15), A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_vM_w)_2Ni_{1-z}N_zO_4$, $-A_xB_yCe_{(1-x-y)}O_2$, where M is alkaline earth metal (such as, e.g., Sr, Ca, Ba, and the like), 0<u<1, and 0<v<1 (preferably 0.25<u<0.75 and 0.25<v<0.75), 0<w<0.3 (preferably, 0.05<w<0.15), N is transition metal (such as, e.g., Cu, Co, Mn, Fe, Cr, and the like), 0<z<0.5 (preferably 0.05<z<0.2), A is rare earth metal (such as La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably one of A and B are Pr and Nd. This may include following cases: 1) A or B is Pr; 2) A or B is Nd; and 3) A is Pr and B is Nd. Cathode barrier layer 26 may be formed of a composition having the general formula $A_xB_yCe_{(1-x)}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal from A (such as, e.g., Gd, La, Pr, Nd, Sm, Tb, Dy, Yb, Y, Ho, Er, and the like), and $0 \leq y < 0.5$ (preferably $0.05 \leq y \leq 0.3$). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

EXAMPLES

Various experiments were carried out to evaluate one or more aspects of example cathode compositions and fuel cells employing such cathode compositions in accordance with the disclosure. However, examples of the disclosure are not limited to the experimental anode compositions.

Figure 4A:
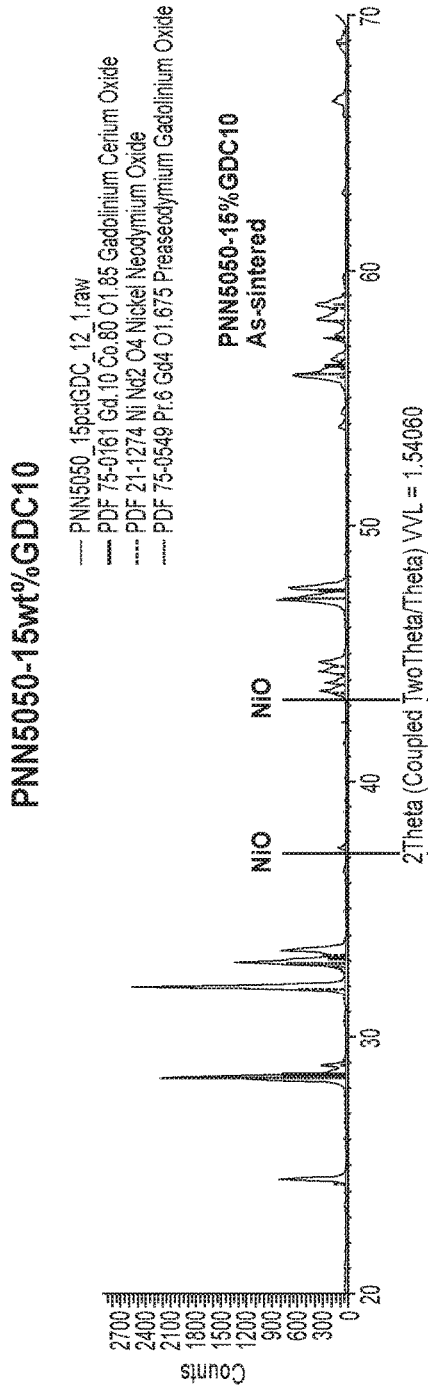
FIGS. 4A and 4B are plots illustrating XRD results for an example nickelate composite cathode composition before and after aging, respectively.
Figure 4B:
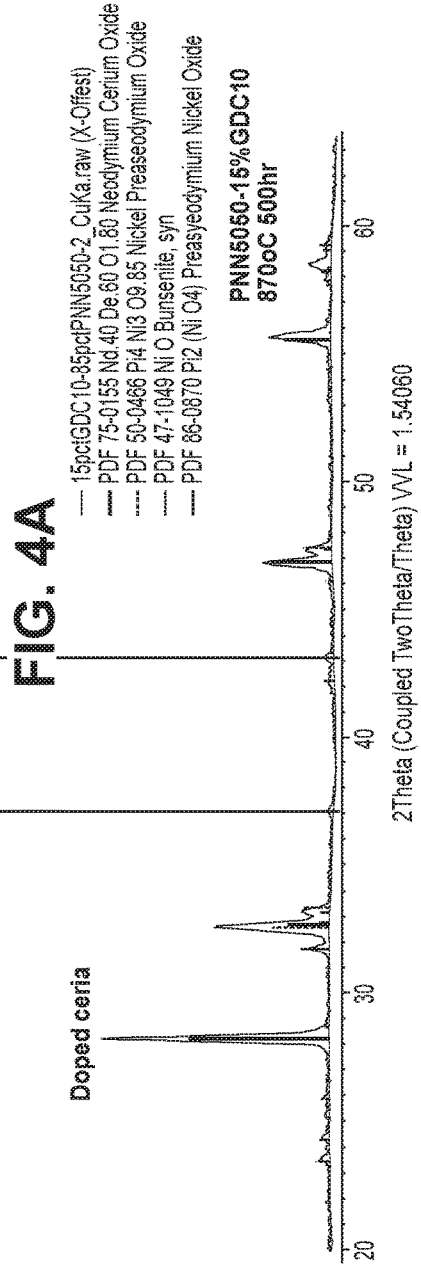

In one instance, nickelate pellets formed of a material having the formula $(Pr_{0.5}Nd_{0.5})_2NiO_4$ were fabricated and then aged for about 500 hours at approximately 870 degrees C. FIG. 3A illustrates XRD patterns of the nickelate pellets as-fabricated. FIG. 3B illustrates XRD patterns of the nickelate pellets after aging. As shown, $PrO_x$ oxide exoluted from the nickelate was identified after aging, which is an undesired third phase since it may change cathode microstructure to reduce triple phase boundary and cause cathode detachment in local area resulted from higher thermal stress due to CTE mismatch In another instance, nickelate composite pellets formed of a material having the formula $(Pr_{0.5}Nd_{0.5})_2NiO_4$-15% GDC10 were fabricated and then aged for about 500 hours at approximately 870 degrees C. FIG. 4A illustrates XRD patterns of the nickelate composite pellets as-fabricated. FIG. 4B illustrates XRD patterns of the nickelate composite pellets after aging. As shown, $PrO_x$ oxide was not formed in the aged nickelate composite since exoluted Pr was diffused in GDC phase. However, a small NiO peak was identified after aging. Even though both $PrO_x$ and NiO may be undesired phases, $(Pr_{0.5}Nd_{0.5})_2NiO_4$-15% GDC10 composite cathode showed much improved phase constitution after 500 hours of aging compared to $(Pr_{0.5}Nd_{0.5})_2NiO_4$ cathode due to significant reduction of undesired phase.

In another instance, nickelate composite pellets formed of a material having the formula $(Pr_{0.5}Nd_{0.5})_2NiO_4$-15% $(Pr_{0.24}Nd_{0.21})Ce_{0.55}O_2$ were fabricated and then aged for about 500 hours at approximately 870 degrees C. FIG. 5A illustrates XRD patterns of the nickelate composite pellets as-fabricated. FIG. 5B illustrates XRD patterns of the nickelate composite pellets after aging. As shown, third phase for both PrOx and NiO was not identified in the material. Additionally, for the example composite cathode material, less material migration occurred during firing and aging. The identified phases were higher order nickelate (e.g., n=3) and doped ceria, (Pr,Nd,Ce)Ox. In this example, $(Pr_{0.5}Nd_{0.5})_2NiO_4$-15% $(Pr_{0.24}Nd_{0.21})Ce_{0.55}O_2$, only higher order nickelate and doped ceria phases existed after 500 hours of aging at 870° C. showing further improved phase constitution compared to $(Pr_{0.5}Nd_{0.5})_2NiO_4$-15% GDC10 composite cathode since both phases are desired phase. As described before, nickelates have different phases, n=1 (lower order phase), 2, and 3 (higher order phase). All are desired phases.

Figure 6A:
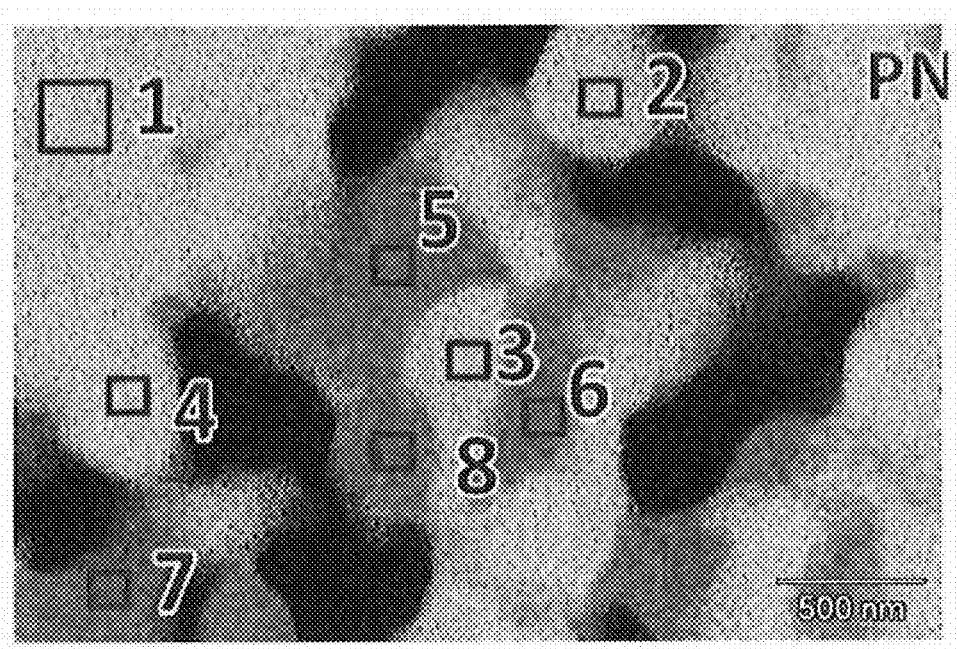
FIGS. 6A and 6B are transmission electron microscopy (TEM) images for two different example cathode compositions.

FIG. 6A is a transmission electron microscopy (TEM) image of the example $(Pr_{0.5}Nd_{0.5})_2NiO_4$ material described above after being aged for about 500 hours at approximately 870 degrees C. As shown in the image, (Pr,Nd)Ox oxide was identified, e.g., at locations 5, 6, 7, and 8 in FIG. 6A.

Figure 6B:
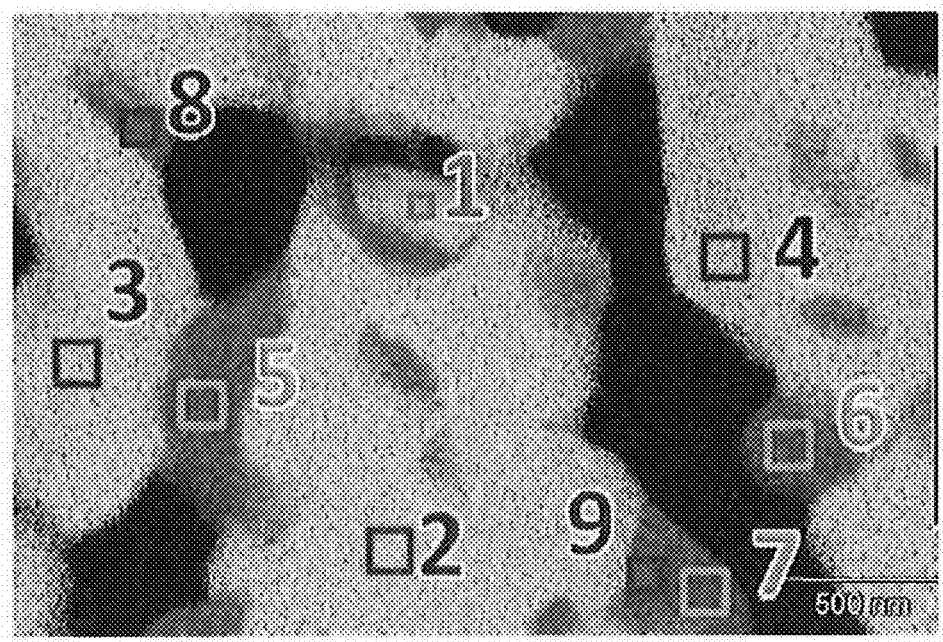

FIG. 6B is a TEM image of the example $(Pr_{0.5}Nd_{0.5})_2NiO_4$-15% GDC10 composite material described above after being aged for about 500 hours at approximately 870 degrees C. As shown in the image, Pr and Nd diffused into GDC and formed $(Pr,Nd,Gd)CeO_2$ solid solution, e.g., at locations 5, 6, and 7 in FIG. 6B. The Pr and Nd in the solid solution was determined to be as high as about 29% and about 20%, respectively. Further, NiO was identified, e.g., as location 1 in FIG. 6B.

The TEM analysis of nickelate or nickelate composite cathode confirmed our hypothesis about rare earth metal exolution from nickelate and its dissolution into second ionic phase, doped ceria. The phase constitution in cathode was able to be managed through selection of rare earth metal as dopant for ceria and dopping level, as well as the addition level of doped ceria in composite cathode.

Figure 7A:
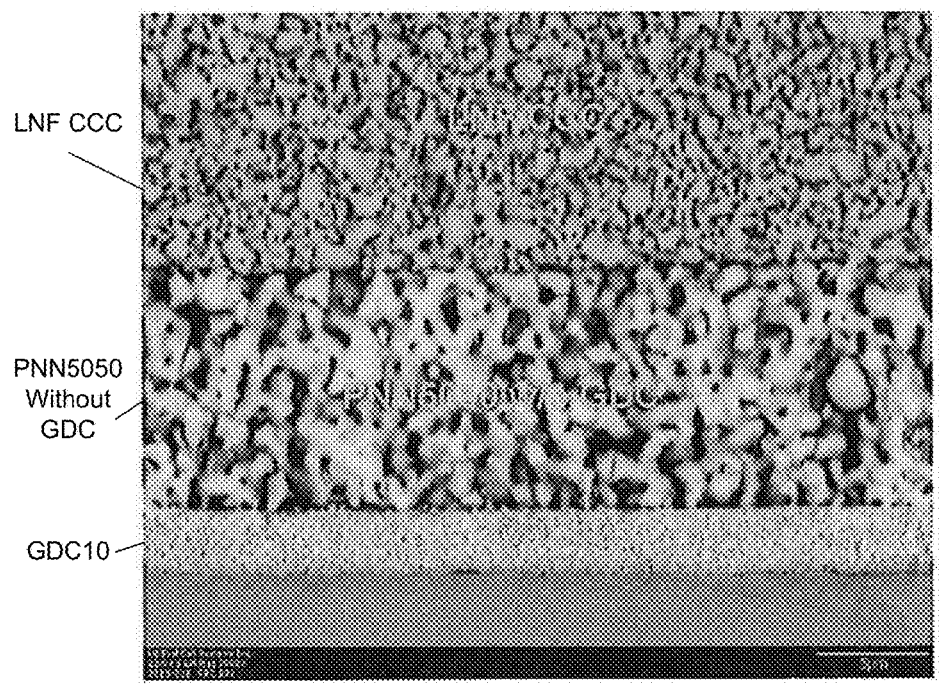
FIGS. 7A and 7B are scanning electron microscopy (SEM) images for two different example cathode compositions.
Figure 7B:
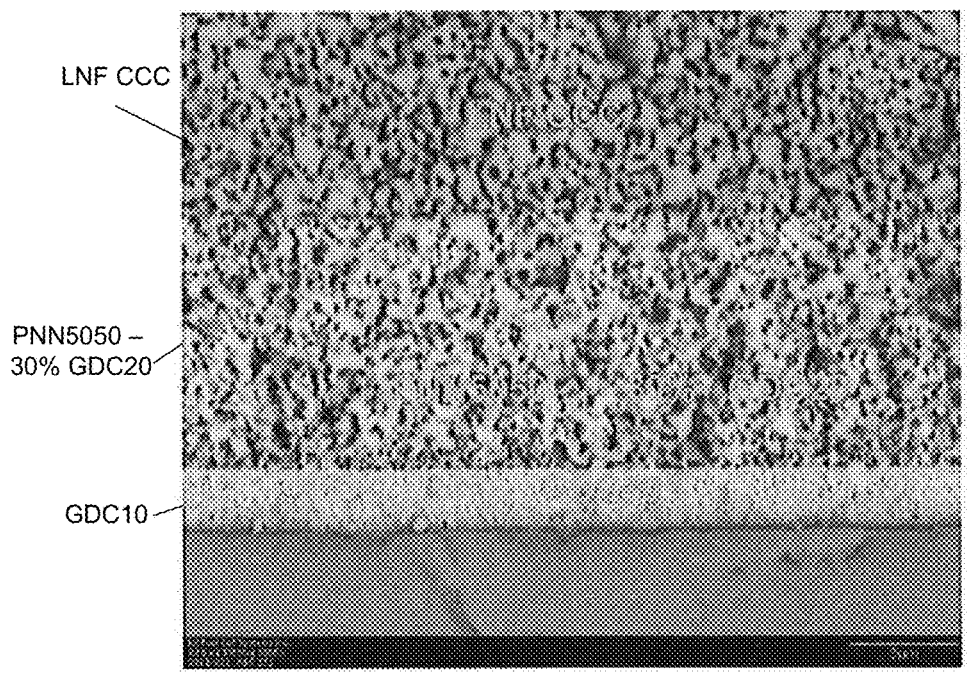

FIGS. 7A and 7B are a scanning electron microscopy (SEM) images of two example electrochemical cell structures (cathode symmetrical cell), after 150 hrs of operation at 870° C., 14% $O_2$-3% $H_2O$, and 300 mA/cm$^2$, including an LNF CCC layer, a nickelate cathode layer, and a GDC10 cathode barrier layer in the configuration shown in FIG. 2 after aging. In the example of FIG. 7A, the cathode was formed of a composition with the formula $(Pr_{0.5}Nd_{0.5})_2NiO_4$ without any GDC. Conversely, in the example of FIG. 7B, the cathode was formed of a composition with the formula $(Pr_{0.5}Nd_{0.5})_2NiO_4$-30% GDC20. As shown, the example cathode of FIG. 7B displayed fine microstructure and better adhesion to the cathode barrier layer as compared to the example cathode of FIG. 7A.

Figure 8:
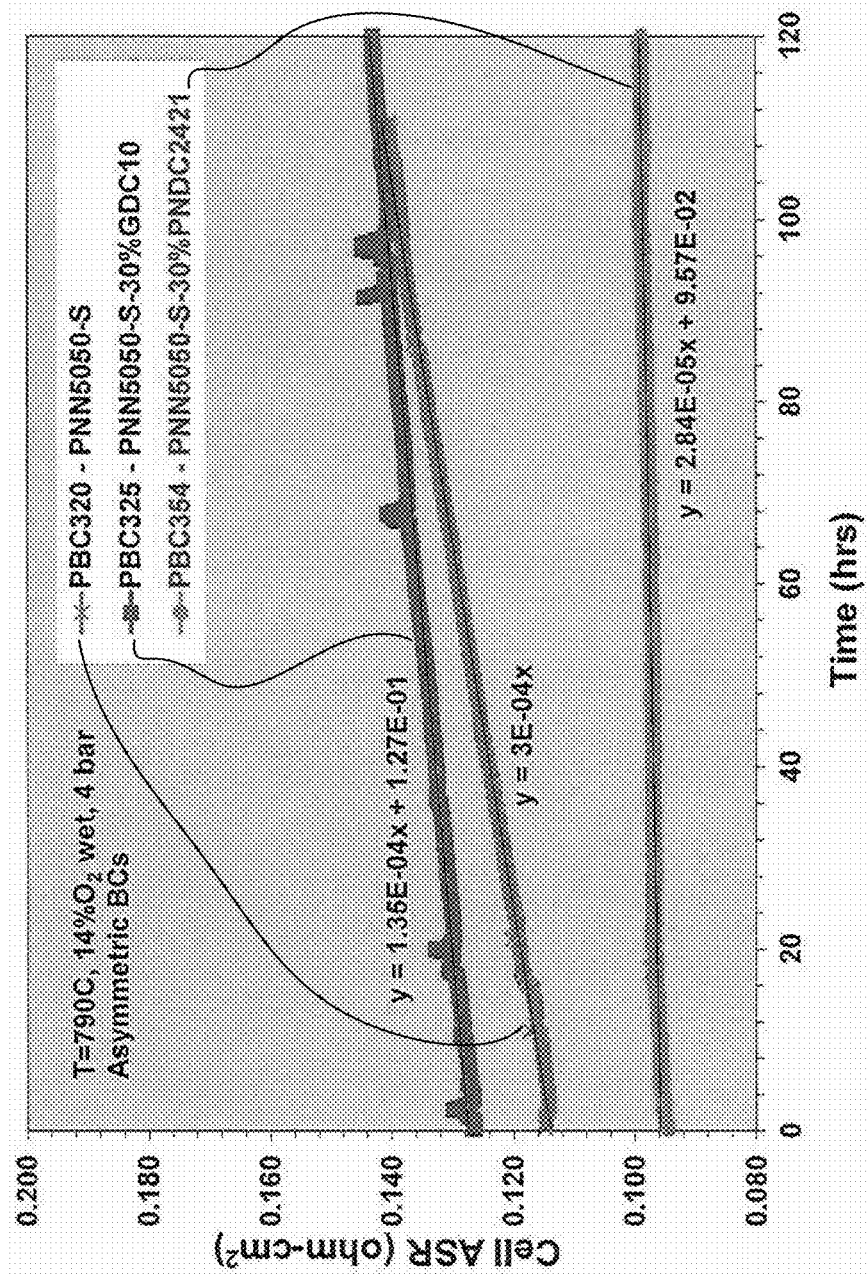
FIG. 8 is a plot illustrating the results of a short-term durability test of example cathode asymmetric button cells.

FIG. 8 is a plot illustrating the results of a short-term durability test of cathode asymmetric button cells (anodic side has the same material) with different example cathodes: 1) $(Pr_{0.5}Nd_{0.5})_2NiO_4$ ("PNN5050"); 2) $(Pr_{0.5}Nd_{0.5})_2NiO_4$-30 wt % GDC10 ("PNN5050-30% GDC10"); and 3) $(Pr_{0.5}Nd_{0.5})_2NiO_4$-15% $(Pr_{0.24}Nd_{0.21})Ce_{0.55}O_2$ ("PNN5050-30% PNDC2421"). In this plot, cell ASR is defined as $(ASR_{anodic}+ASR_{cathodic}+ASR_{ele})/2$. These button cells included of GDC10 as a cathode barrier layer and LNF as a cathode current collector. As shown in the plot, it can be seen that the cell degradation rate was decreased from about 0.3 ohm-cm$^2$/1000 hrs for the PNN5050 nickelate cathode to about 0.1 ohm-cm$^2$/1000 hrs for PNN5050-30% GDC10, and then about 0.03 ohm-cm$^2$/1000 hrs for PNN5050-30% PNDC2421, which also had lower ASR. As discussed in previous paragraphs, when the cathode composition was changed from $(Pr_{0.5}Nd_{0.5})_2NiO_4$ ("PNN5050") to $(Pr_{0.5}Nd_{0.5})_2NiO_4$—ionic composite cathode, the undesired third phase was significantly decreased (compare FIG. 3B and FIG. 4B). When the cathode composition was changed from $(Pr_{0.5}Nd_{0.5})_2NiO_4$-GDC10 to $(Pr_{0.5}Nd_{0.5})_2NiO_4$-15% $(Pr_{0.24}Nd_{0.21})Ce_{0.55}O_2$ composite phase, the phase constitution was further improved after aging and the third undesired phase was eliminated. Although not wishing to be bound by theory, we believed the third undesired phase can cause cathode microstructure change to reduce triple phase boundary and cathode detachment in local area. These changes may increase cell ASR (cells ASR includes cathodic and anodic polarization, and electrolyte ohmic resistance). The testing results were consistent with this analysis.

Figure 9:
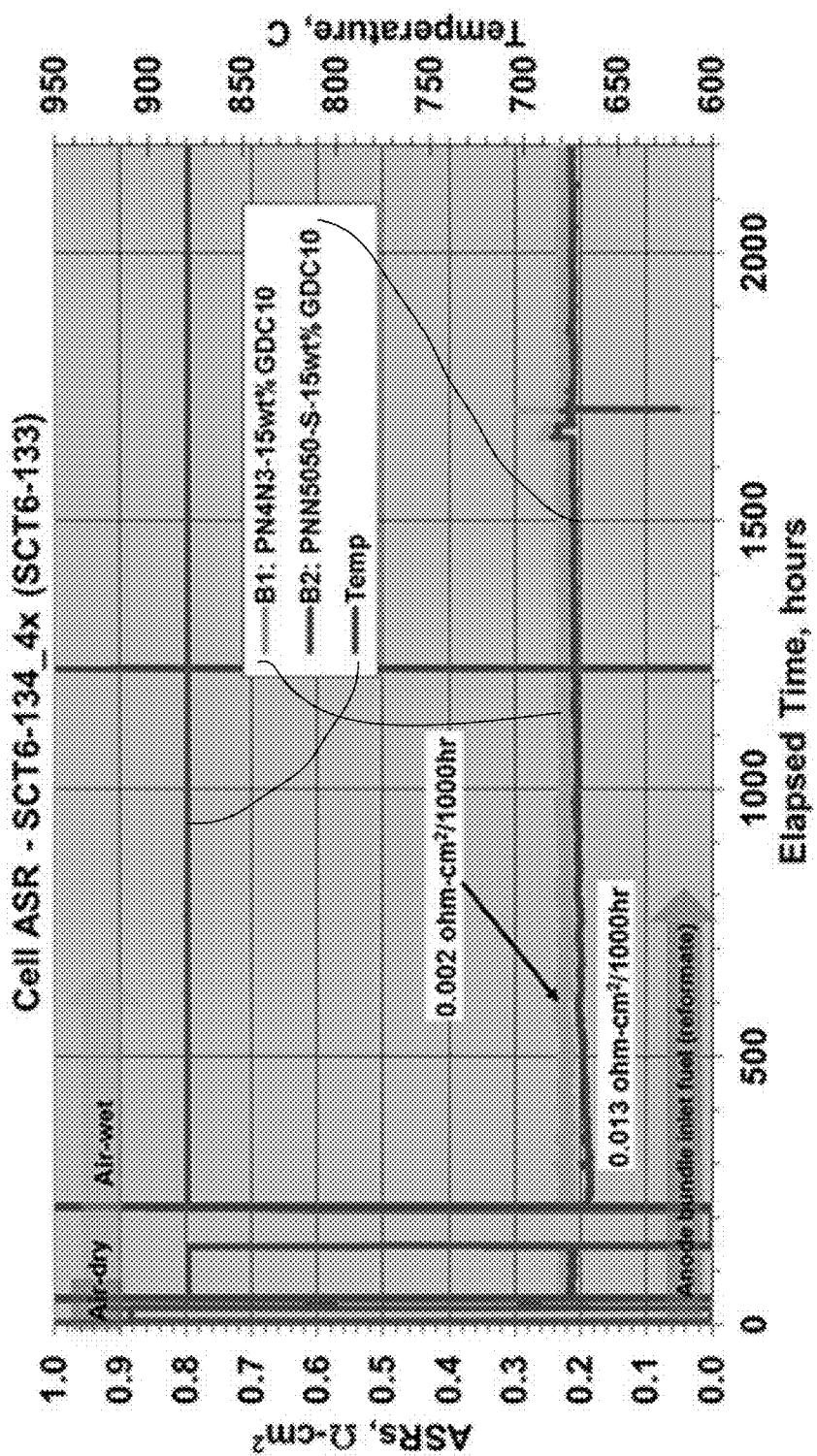
FIGS. 9 and 10 are plots of results from long term durability test carried out on example nickelate and/or nickelate composite cathodes.

FIG. 9 is a plot of results from a long term durability test of nickelate composite cathodes $((Pr_{0.5}Nd_{0.5})_4Ni_3O_{10}$ ($PN_4N_3$)-15 wt % GDC10 and PNN5050-15 wt % GDC10) using subscale cell with segment-in-series cell design (the active cell was printed on porous substrate) at about 880 degrees Celsius, wet air, and reformate fuel. After about 2,200 hours of operation, the cell ASR was about 0.2 ohm-cm$^2$, and degradation rate was about 0.002 ohm-cm$^2$/1000 hr for the (PN$_4$N$_3$)-15 wt % GDC10 cathode and about 0.013 ohm-cm$^2$/1000 hr for the PNN5050-15 wt % GDC10 cathode.

Figure 10:
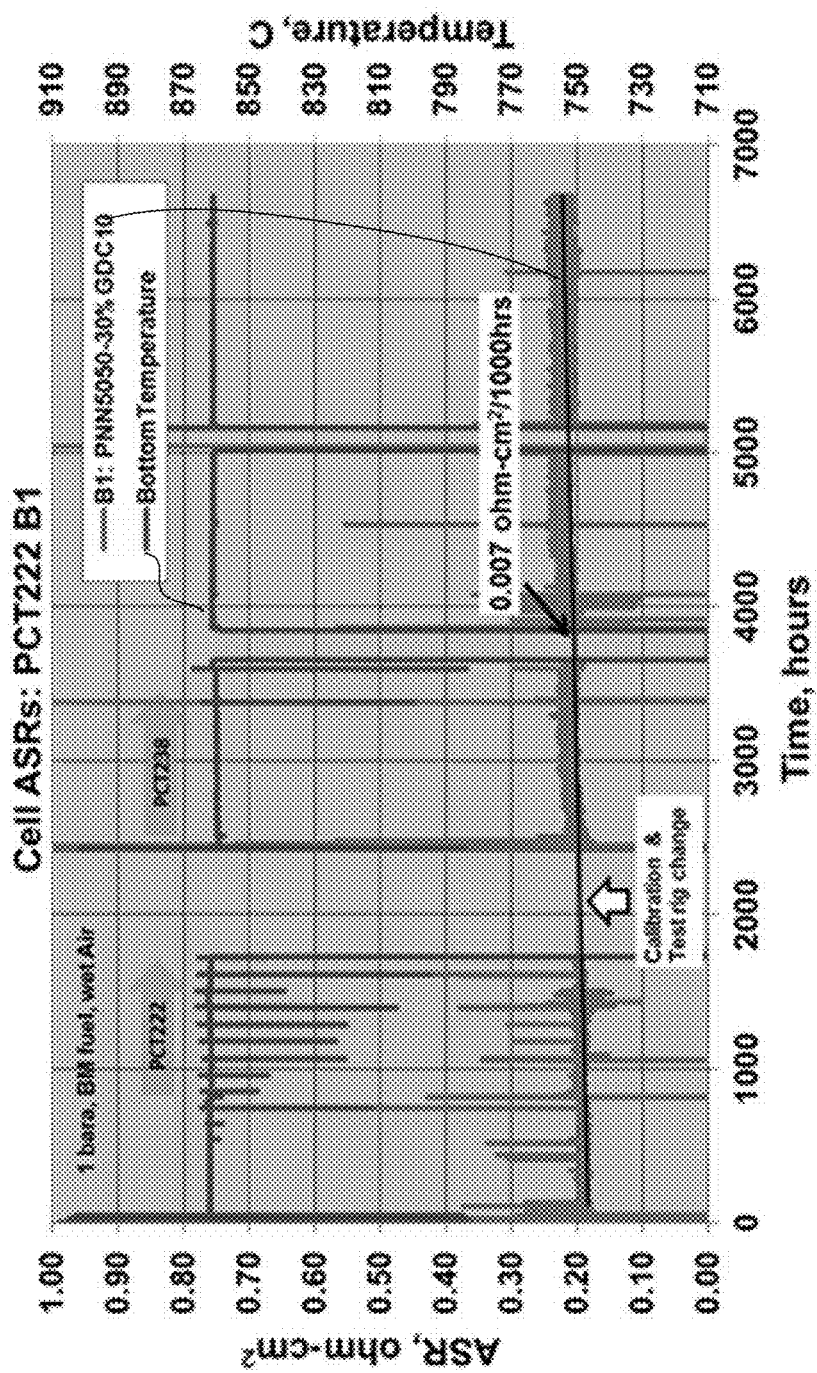

FIG. 10 is a plot of results from a long term durability test of nickelate composite cathode, PNN5050-30 wt % GDC10, using subscale cell with segment-in-series cell design (active cells were printed on porous substrate) at about 860 degrees Celsius, wet air, and reformate fuel. After about 6,600 hours of operation, the cell ASR was about 0.22 ohm-cm$^2$, and degradation rate was about 0.007 ohm-cm$^2$/1000 hr.

Figure 11:
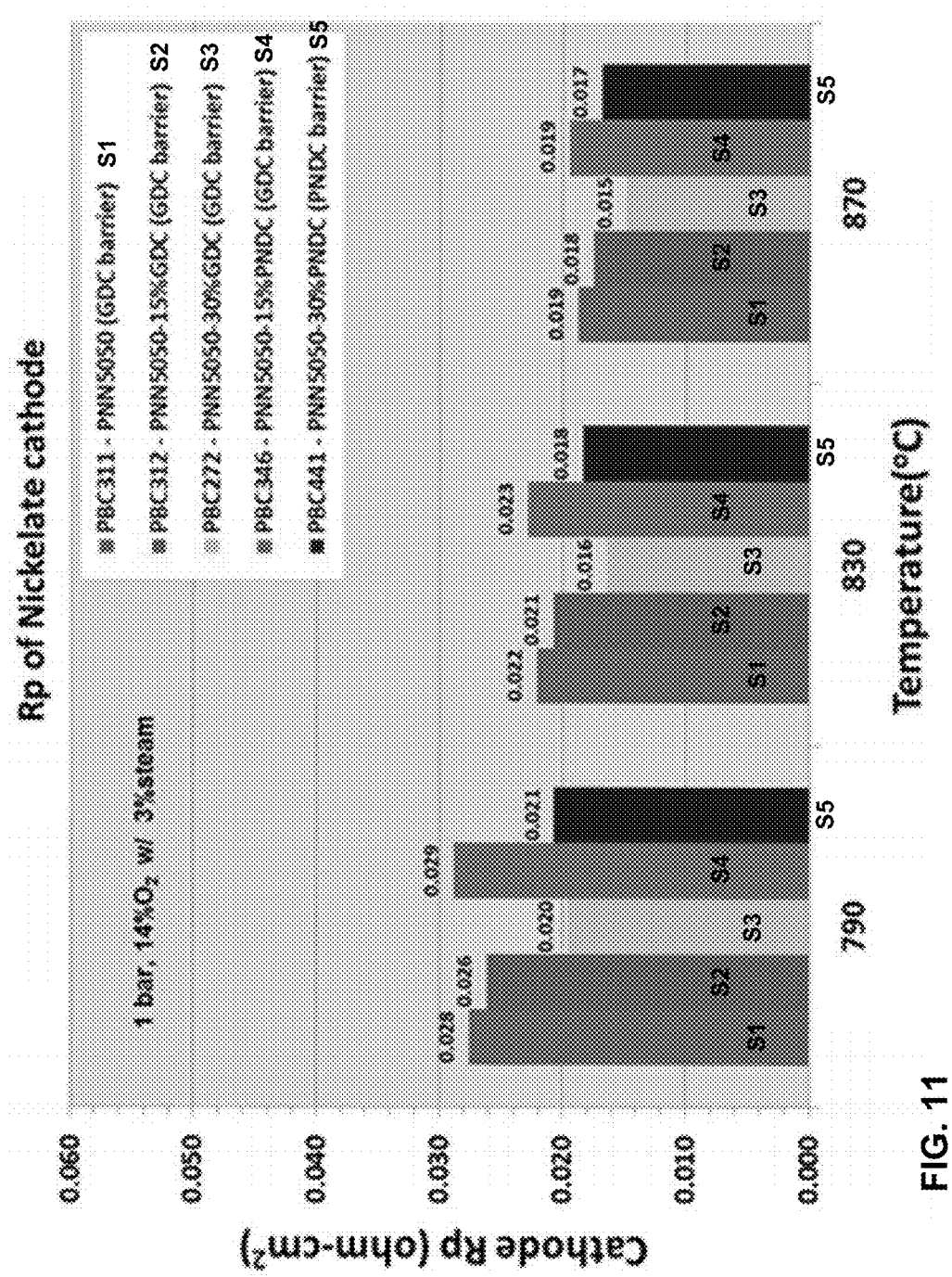
FIG. 11 is bar chart showing cathode polarization for various example nickelate composite cathodes.

FIG. 11 is bar chart showing cathode polarization (Rp) of various nickelate composite cathodes with cathode barrier layer tested under 14% O$_2$-3% steam and 1 bara using cathode symmetric button cells (for button cell, the electrolyte is thicker, about 100 micron vs 10 microns for segmented-in-series cell design). For some nickelate composite cathodes with 30 wt % ionic phase, polarization was about 0.02 ohm-cm$^2$ or lower at about 790 to about 870 degrees Celsius.

Various embodiments of the invention have been described. These and other embodiments are within the scope of the following claims.

The invention claimed is:

1. A fuel cell comprising:
    an anode;
    an electrolyte;
    cathode barrier layer; and
    a nickelate composite cathode separated from the electrolyte by the cathode barrier layer; and
    a cathode current collector layer,
    wherein the nickelate composite cathode includes a nickelate compound and an ionic conductive material,
    wherein the nickelate compound comprises at least one of:
        Pr$_2$NiO$_4$,
        Nd$_2$NiO$_4$,
        (Pr$_u$Nd$_v$)$_2$NiO$_4$,
        (Pr$_u$Nd$_v$)$_3$Ni$_2$O$_7$,
        (Pr$_u$Nd$_v$)$_4$Ni$_3$O$_{10}$, or
        (Pr$_u$Nd$_v$M$_w$)$_2$NiO$_4$, where M is an alkaline earth metal doped on an A—site of Pr and Nd, 0<u<1, 0<v<1 and 0<w<0.3,
    wherein the ionic conductive material comprises a first co-doped ceria with a general formula of (A$_x$B$_y$)Ce$_{1-x-y}$O$_2$, where A and B of the first co-doped ceria are rare earth metals, and wherein x>0 and y>0,
    wherein the cathode barrier layer is configured to control rare earth metal oxide exolution from the nickelate compound to manage phase constitution in the nickelate composite cathode to keep desired phases for lower degradation rate,
    wherein the cathode barrier layer is Pr-containing co-doped ceria, (Pr$_s$B$_t$)Ce$_{1-s-t}$O$_2$ wherein B is rare earth metal or wherein the cathode barrier layer is Pr and Nd co-doped ceria, (Pr$_s$Nd$_t$)Ce$_{1-x-y}$O$_2$, and wherein x>0 and y>0,
    wherein the anode, cathode barrier layer, nickelate composite cathode, cathode current collector layer, and electrolyte are configured to form an electrochemical cell.

2. The fuel cell of claim 1, wherein the cathode barrier layer is configured to prevent material diffusion between the nickelate composite cathode and electrolyte and increase phase stability of the nickelate composite cathode.

3. The fuel cell of claim 1, wherein the ionic conductive material is Pr-containing co-doped ceria, (Pr$_x$B$_y$)Ce$_{1-x-y}$O$_2$, wherein B is rare earth metal.

4. The fuel cell of claim 1, wherein the ionic conductive material is Nd-containing co-doped ceria, (Nd$_x$B$_y$)Ce$_{1-x-y}$O$_2$, wherein B is rare earth metal.

5. The fuel cell of claim 1, wherein ionic conductive material is Pr and Nd co-doped ceria, (Pr$_x$Nd$_y$)Ce$_{1-x-y}$O$_2$.

6. The fuel cell of claim 1, wherein the nickelate composite cathode is substantially free of oxide formed exoluted A-site element and/or B-site element from the nickelate compound following operation at a temperature of approximately 790 degrees Celsius or greater after approximately 100 hours.

7. The fuel cell of claim 1, wherein the nickelate composite cathode includes diffused exolute from the nickelate compound in a phase of the ionic conductive material following operation at a temperature of approximately 790 degrees Celsius or greater after approximately 100 to 2000 hours.

8. The fuel cell of claim 1, wherein the fuel cell including the nickelate composite cathode exhibits an area specific resistance (ASR) of approximately 0.22 ohm-cm$^2$ or lower following operation at a temperature of approximately 860 degrees Celsius after approximately 6600 hours.

9. The fuel cell of claim 1, wherein the cathode barrier layer is configured to prevent chemical interaction between the electrolyte and the nickelate compound that forms zirconate phase.

10. The fuel cell of claim 1, wherein the nickelate composite cathode exhibits a thickness from approximately 3 microns to approximately 30 microns.

11. The fuel cell of claim 1, wherein the fuel cell is configured as one of a segmented-in-series cell pattern, tubular cell, anode supported planar cell, or electrolyte supported planar cell.

12. The fuel cell of claim 1, wherein the cathode current collector comprises a conductive ceramic that is chemically compatible with the nickelate composite cathode.

13. The fuel cell of claim 1, wherein the nickelate composite cathode consists of or consists essentially of the nickelate compound and ionic conductive material.

14. The fuel cell of claim 1, wherein 0<x<0.5 and 0<y<0.5, and 0<s<0.5 and 0<t<0.5.

* * * * *